United States Patent [19]

Askew

[11] Patent Number: 5,469,877
[45] Date of Patent: Nov. 28, 1995

[54] ELECTRIC TO PNEUMATIC TRANSDUCER

[75] Inventor: Andy R. Askew, Winston-Salem, N.C.

[73] Assignee: Fairchild Industrial Products Company, Winston-Salem, N.C.

[21] Appl. No.: 101,745

[22] Filed: Aug. 4, 1993

[51] Int. Cl.[6] .................................................. G05D 16/20
[52] U.S. Cl. ...................... 137/85; 137/487.5; 137/627.5
[58] Field of Search ........................... 137/85, 82, 487.5, 137/627.5

[56] References Cited

U.S. PATENT DOCUMENTS

| | | | |
|---|---|---|---|
| 4,579,137 | 4/1986 | Brandt, Jr. | 137/82 X |
| 4,665,938 | 5/1987 | Brown et al. | 137/85 |
| 4,898,200 | 2/1990 | Odajima et al. | 137/85 |
| 5,370,152 | 12/1994 | Carey et al. | 137/85 X |

Primary Examiner—Martin P. Schwadron
Assistant Examiner—Kevin L. Lee
Attorney, Agent, or Firm—Michael W. York

[57] ABSTRACT

An electric to pneumatic transducer including a transducer housing with a primary converting housing section and a relay housing section. The primary converting housing section contains feedback and control electronics and an electronic feedback sensor that are electrically connected. The feedback and control electronics are adapted to be connected to an electronic signal input. The primary converting housing section also contains a nozzle and associated flapper control for controlling the output from the nozzle and the primary converting housing section also contains a bleed orifice. The relay housing section contains a relay control chamber with a positive bias spring that exerts a force on an upper control diaphragm and an associated lower control diaphragm that are in turn associated with a combined exhaust and supply valve.

6 Claims, 1 Drawing Sheet

ELECTRIC TO PNEUMATIC TRANSDUCER

BACKGROUND OF THE INVENTION

Transducers are used in a wide variety of applications in industry such as in the control of industrial processing lines and the like. It is important that the transducer operate promptly and reliably in order that the associated equipment functions in a proper reliable manner.

In many situations a transducer will be exposed to motion or vibrations that can possibly be severe and cause the transducer to operate improperly or inaccurately. It is also desirable in many situations that the transducer be compact and consume relatively little electrical power and yet be very accurate. Many situations also require a transducer that is inexpensive and easy to manufacture but is easy to service. Unfortunately, many present transducers do not meet all of these requirements.

This transducer invention overcomes many of the problems associated with previous transducers and provides a transducer that is capable of withstanding motion and severe vibrations and operate accurately and reliably. This transducer is simple in its operation and is easy and economical to manufacture. The transducer is also very reliable and is easy to service and requires very little electrical power for its operation.

SUMMARY OF THE INVENTION

This invention relates to transducers and more particularly to electric to pneumatic transducers.

It is accordingly an object of the invention to provide an electric to pneumatic transducer that is effective in its operation.

It is an object of the invention to provide an electric to pneumatic transducer that is very stable.

It is an object of the invention to provide an electric to pneumatic transducer that has electronic negative feedback.

It is an object of the invention to provide an electric to pneumatic transducer that is not influenced by mechanical vibrations.

It is an object of the invention to provide an electric to pneumatic transducer that is not influenced by motion.

It is an object of the invention to provide an electric to pneumatic transducer that is not influenced by attitude changes.

It is an object of the invention to provide an electric to pneumatic transducer that uses a stiff flapper mechanism.

It is an object of the invention to provide an electric to pneumatic transducer that is compact.

It is also an object of the invention to provide an electric to pneumatic transducer that is light weight.

It is an object of the invention to provide an electric to pneumatic transducer that is accurate.

It is an object of the invention to provide an electric to pneumatic transducer that is very reliable.

It is an object of the invention to provide an electric to pneumatic transducer that is easy to service.

It is an object of the invention to provide an electric to pneumatic transducer that is easy to manufacture.

It is an object of the invention to provide an electric to pneumatic transducer that is inexpensive to manufacture.

It is an object of the invention to provide an electric to pneumatic transducer that has low power consumption.

It is an object of the invention to provide an electric to pneumatic transducer that uses a fluid such as air or other gases.

It is an object of the invention to provide an electric to pneumatic transducer that has a fast response.

It is an object of the invention to provide an electric to pneumatic transducer that has a very precise response.

These and other objects will be apparent from the electric to pneumatic transducer invention that provides an electric to pneumatic transducer comprising a transducer housing including a primary converting housing section and a relay housing section. The primary converting housing section contains feedback and control electronics that are connected to an electronic feedback sensor and are adapted to be connected to an electric signal input. The primary converting housing section also contains a nozzle and associated flapper control for controlling fluid air output from the nozzle. The primary converting housing section also contains a bleed orifice. The relay housing section contains a relay control chamber with a positive bias spring that exerts a force on an upper control diaphragm and an associated lower control diaphragm that are in turn associated with a combined exhaust and supply valve.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
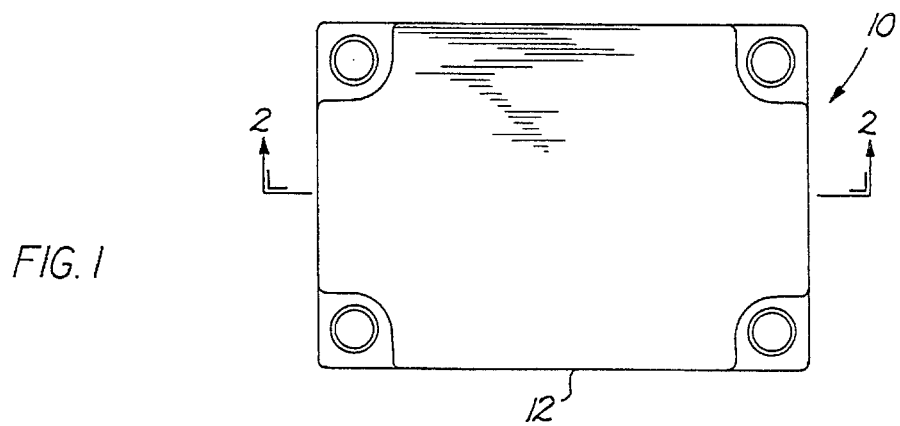
FIG. 1 is a top plan view of the electric to pneumatic transducer invention.
Figure 2:
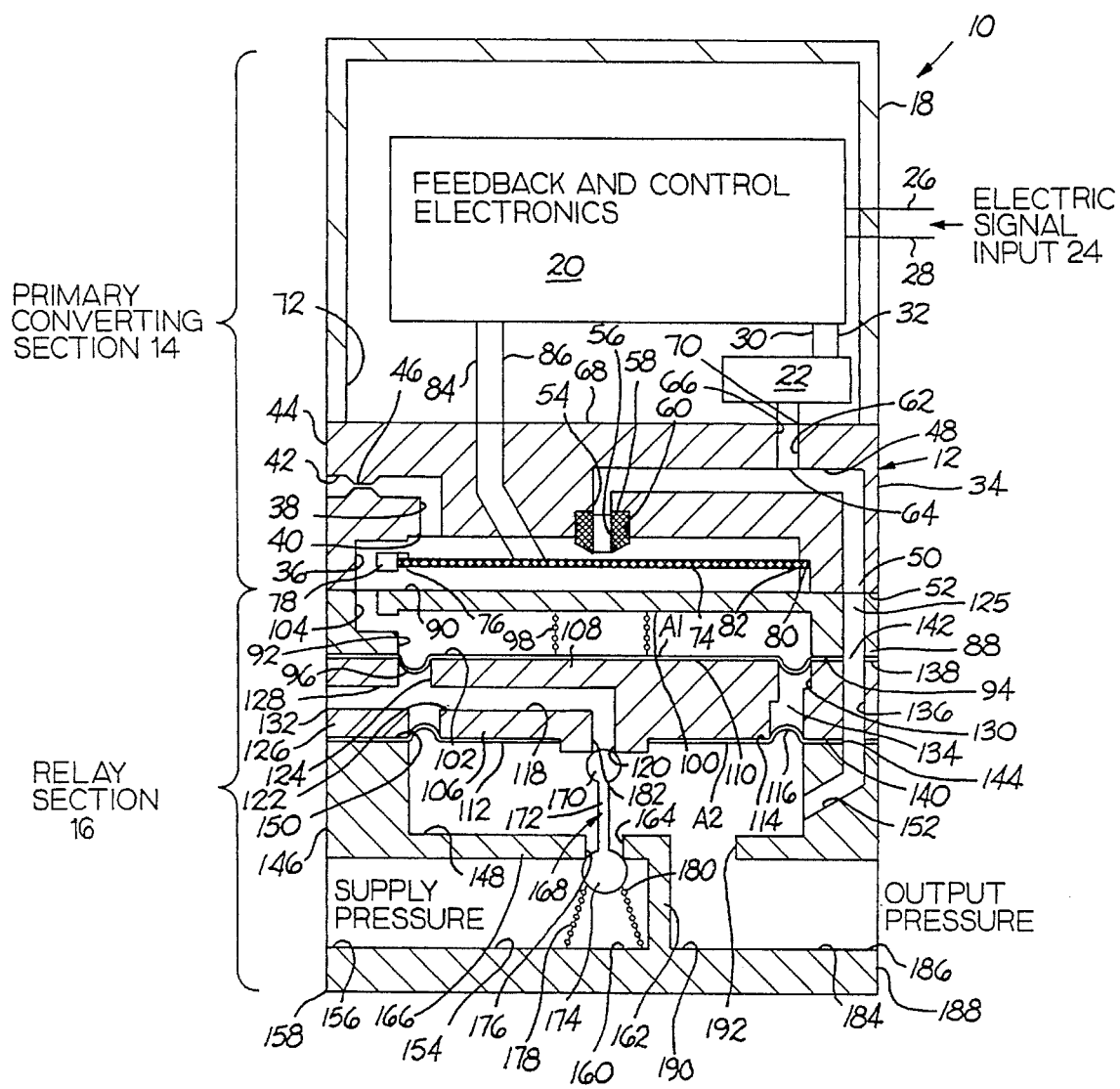
FIG. 2 is an enlarged sectional view of the electric to pneumatic transducer invention set forth in FIG. 1 taken substantially on the line 2—2 thereof.

Referring to FIGS. 1 and 2, the electric to pneumatic transducer invention is illustrated and is designated generally by the number 10. The electric to pneumatic transducer 10 includes a generally rectangular shaped housing 12. The housing is basically divided into two portions or sections with the upper section that is a primary converting section being designated generally by the number 14 and the other lower section that is a relay housing section being designated generally by the number 16.

The primary converting section 14 has an upper hollow housing portion 18 that contains the feedback and control electronics 20 and an electronic feedback sensor 22. The feedback and control electronics 20 are provided with an electric signal input 24 on the leads 26 and 28 that are electrically connected to the feedback and control electronics 20 and the feedback and control electronics 20 are also electrically connected to the electronic feedback sensor 22 via the leads 30 and 32 that electrically interconnect the feedback and control electronics 20 and the electronic feedback sensor 22.

The primary converting section 14 also has a lower housing portion 34 with a lower recess or cavity 36. The lower housing portion 34 has an aperture or conduit 38 extending through it whose inner end portion 40 is in fluid communication with the cavity 36 and whose outer end portion 42 is in fluid communication with the exterior surface 44 of the lower housing portion 34 which is also the exterior surface of the housing 12. The conduit 38 also contains a restricted portion or bleed orifice 46. The lower housing portion 34 also has a substantially U-shaped conduit 48 with a lower outer end portion 50 that is in fluid communication with the outer lower surface 52 of the lower housing portion 34. The inner end portion 54 of the conduit 48 is connected to and is in fluid communication with an aperture 56 and a substantially cylindrically shaped nozzle member 58 that is located in and secured in a cylindrical hole 60 in the lower housing portion 34.

The lower housing portion 34 also has another conduit 62 whose lower end portion 64 is connected to and is in fluid communication with the conduit 48. The upper end portion 66 of the conduit 62 extends to the upper surface 68 of the lower housing portion 34. The upper end portion 66 of the conduit 62 is located to be in fluid communication with the lower end portion of a conduit 70 in the lower portion 72 of the upper housing portion 18. The upper end portion of the conduit 70 is also in fluid communication with the electronic feedback sensor 22. Through this arrangement of the conduits 62 and 70 the electronic feedback sensor 22 senses the pressure in the conduit 48 that leads to the nozzle member 58.

As also illustrated in FIG. 2, a flapper member 74 that is an electro-mechanical actuator called a Bimorph has one portion 76 secured in place by a securing member 78 within the cavity 36. The cavity 36 has a ridge 80 located within it that is sized, shaped and located to allow the outer end portion 82 of flapper member 74 to rest on it. The flapper member 74 is connected to the electrical leads 84 and 86 that are in turn connected to the feedback and control electronics 20 and the electronic signals via these leads 84 and 86 permit the electronic and control electronics 20 to control the shape of the flapper member 74 and whether it covers the aperture 56 in the nozzle member 58.

The relay section 16 has an upper housing section 88 that has an upper surface 90 that serves to close off the open portion of the cavity 36 in the lower housing portion 34 of the primary converting section 14 and hence convert the cavity 36 into a closed chamber. The relay section upper housing 88 has a cavity 92 that extends to its lower outer surface 94. This cavity 92 has its opening closed by an upper control diaphragm 96 so that the cavity 92 is formed into a relay control chamber. The relay control chamber or cavity 92 has a centrally located positive bias coil spring 98 that has its upper end located and pushing against the upper inner surface 100 of the relay control chamber or cavity 92 and a lower end portion located and pushing against the upper surface 102 of the upper control diaphragm 96. This causes the upper control diaphragm 96 to be biased in a downward or outward direction with respect to the upper inner surface 100 of the relay control chamber or cavity 92.

The upper relay housing section 88 has an aperture or conduit 104 that extends from the chamber or cavity 92 to the upper surface 90 of the upper relay housing section 88 and this permits the chamber or cavity 92 to be in fluid communication with the cavity or chamber 36 of the primary converting section 14. A movable exhaust valve member 106 is located below and has its upper surface 108 connected to the lower surface 110 of the upper control diaphragm 96. The lower surface 112 of the exhaust valve member 106 is located adjacent to and connected to the upper surface 114 of a lower control diaphragm 116, The exhaust valve member 106 has an aperture or conduit 118 located in it and the inner end portion 120 of this conduit 118 is located in the center portion of the lower surface 112 of the exhaust valve member 106. This inner end portion 120 of the conduit 118 forms an exhaust valve seat. The other outer end portion 122 of the conduit 118 extends to and is in fluid communication with the outer exterior surface 124 of the exhaust valve member 106.

The upper relay housing section 88 also has a conduit aperture 125 that extends through it from its upper surface 90 to its lower surface 94. The upper end of the aperture 125 is sized, shaped and located to substantially match the location, size and shape of the lower end portion 50 of the conduit 48 of the lower housing portion 34 that is in fluid communication with its outer lower surface 52.

A hollow ring member 126 is located around the exhaust valve member 106 between the respective upper and lower control diaphragms 96 and 116. The hollow ring member 126 has an outward extending aperture or conduit 128 that extends from the inner surface 130 of the ring member 126 to its outer surface 132. As a consequence, fluid can flow from the exhaust valve seat 120 of the conduit 182 of the exhaust valve member 106 through the conduit 118 to the outside surface 124 of the exhaust valve member 106. From there, fluid enters a chamber 134 between the inner surface 130 of the ring member 126, the outer surface 124 of the exhaust valve member 106 and the inner surfaces of the upper and lower control diaphragms 96 and 116. From chamber 134, the fluid, which would be typically a gas, passes through the conduit 128 in the ring member 126 to the exterior surface 44 of the housing 12.

The hollow ring member 126 has an aperture or conduit 136 that extends from the upper surface 138 of the ring member 126 to its lower surface 140. The respective upper and lower control diaphragms 96 and 116 have respective apertures 142 and 144 that are sized, shaped and located to coincide with the respective upper and lower openings of the conduit or aperture 136 in the ring member 126. The size, shape and location of the aperture 142 in the upper control diaphragm 96 substantially matches the location and size of the lower end of the conduit 125 in the upper relay housing section 88. It should be noted that the effective area A1 of the upper control diaphragm 96 is greater that the effective area A2 of the lower control diaphragm 116 located adjacent to the area of the lower surface 112 of the exhaust valve member 106. This difference is essential to the proper functioning of the electric to pneumatic transducer 10 as will be hereinafter described in detail.

As illustrated in FIG. 2, a supply valve housing 146 is located immediately below and is connected to the lower control diaphragm 116. The upper portion of the supply valve housing 146 has a large exhaust valve cavity 148 in it that extends to the upper surface 150 of the supply valve housing 146. The lower control diaphragm and the associated exhaust valve member 106 close off this cavity 148 to form an exhaust valve chamber. The supply valve housing 146 has an aperture 152 in it that extends from the exhaust valve chamber 148 to the upper surface 150 of the supply valve housing 146. The upper end portion of the aperture 152 that terminates at the upper surface 150 is sized, shaped. and located so as to substantially coincide with the hole 144 in the lower control diaphragm 116. As a consequence, fluid can pass from the exhaust valve chamber 148 through the aperture 152, the hole 144 in the lower diaphragm 116, the aperture 136 in the ring member 126, the hole 142 in the upper diaphragm 96, the aperture 125 in the relay section upper housing 88 to the conduit 48 in the lower housing portion of the primary converting section 14. From there fluid passes to the nozzle member 58 and also to the electronic feedback sensor 22 via the conduits 66 and 70.

The supply valve housing 146 has a substantially circular cross section supply pressure aperture 154 whose outer end portion 156 extends to the outside surface 158 of the supply valve housing 146. This outer end portion is sized, shaped and located to be connected to a suitable source of pressurized fluid such as a gas or gases such as air (not shown). The inner end portion 160 is closed off by a partition 162. However, a substantially circular shaped cross section aperture 164 is located in the upper sidewall 166 of the supply pressure aperture 154. This aperture 164 extends from the supply pressure aperture 154 to the previously described exhaust valve chamber 148. A combined exhaust valve and supply valve member 168 is located in the aperture 164 and the combined exhaust valve and supply valve member 168 has an upper substantially spherical shaped portion 170 that is sized, shaped and located to engage the exhaust valve seat 120 of the conduit 118. The combined exhaust valve and supply valve member 168 has a central elongated intermediate portion 172 that has a substantially circular cross section. An enlarged substantially spherical shaped portion 174 is located on the lower end of the intermediate portion 172 and this spherical shaped portion 174 is sized, shaped and located to engage the lower end portion 176 of the aperture 164 that serves as a seat for the spherical shaped portion 174.

As illustrated in FIG. 2, a substantially conical shaped coil compression spring 178 is located within the inner end portion 160 of the supply pressure aperture 154. The smaller upper end portion 180 of the compression spring 178 pushes up against the spherical shaped portion 174 and biases it and the associated intermediate portion 172 and spherical shaped upper end portion 170 in an upward direction so that the spherical shaped upper end portion 170 engages the exhaust valve seat 120 and closes off the lower entrance 182 to the conduit 118. In addition, the compression spring 178 that pushes up against the spherical shaped portion 174 biases it into contact with the valve seat 176 or the lower end portion of the aperture 164 to close off this lower end portion 176 to the passage of any fluid. The supply valve housing 146 also has a substantially circular shaped cross section aperture 184 whose outer end portion 186 extends to the outside surface 188 of the supply valve housing 146. The inner end portion 190 of the aperture 184 is connected via the aperture 192 to the exhaust valve chamber 148.

The electric to pneumatic transducer 10 is manufactured in the following manner. The various components of the housing such as the upper housing portion 18, the lower housing portion 34, the upper housing portion 88, the ring member 126 and the supply valve housing 146 as well as the exhaust valve member 106 are manufactured using suitable casting and machining techniques known in the art from a suitable grade of aluminum.

The control diaphragms 96 and 116 are conventional and are well known and easily obtainable by those skilled in the art. Although the control diaphragms 96 and 116 are conventional, the selection of the respective effective areas A1 and A2 are not and the selection of these areas is very important to the proper functioning of the electric to pneumatic transducer 10. For the proper functioning of the electric to pneumatic transducer 10 the ratio R of the respective areas A1 and A2 should be substantially as follows:

$$\frac{A1}{A2} = \frac{Po - Pb}{Ps}$$

or

-continued $$R = \frac{A1}{A2} = \frac{Po - Pb}{Ps}$$

with $1.5 > R > 1.0$ where:
A1=Effective area of the diaphragm 96
A2=Effective area of the diaphragm 116
R=Area ratio of the diaphragms A1 and A2
Po=Output pressure in the chamber 148
Ps=Signal pressure in the relay control chamber 92
Pb=Positive bias pressure created by the positive bias spring 98

In the preferred embodiment R is substantially equal to 1.22.

The nozzle member 58 and the combined exhaust and supply valve member 168 are manufactured by suitable machinery from a suitable steel known in the art such as stainless steel. The coil springs 98 and 178 are conventional and manufactured from suitable piano or spring wire or the like in a manner well known in the art. The feedback and control electronics 20 are conventional in nature and are well known to those skilled in the art. The exact selection of components for the feedback and control electronics will obviously depend upon the particular application for the electric to pneumatic transducer 10. What has been stated with respect to the feedback and control electronics 20 also applies to the electronic feedback sensor 22 since it is also well known to those skilled in the art. The flapper member 74 is a standard piezoceramic electro-mechanical actuator called a Bimorph that is available from Morgan Matroc, Electro-Ceramics Division of Bedford, Ohio. The assembly of the electric to pneumatic transducer 10 is accomplished in a conventional manner as will be obvious to one skilled in the art.

The electric to pneumatic transducer 10 is used in the following manner. The outer end portion 156 of the supply pressure aperture 154 is connected via a conventional high pressure hose or the like (not shown) known in the art to a source of high pressure fluid such as pressurized air (not shown). In a similar manner, the outer end portion 186 of the output pressure aperture 184 is connected via a high pressure hose or the like (not shown) known to those skilled in the art to an appropriate piece of equipment (not shown) known to those skilled in the art. Fluid can also leave the housing 12 through the aperture 128. The electric to pneumatic transducer 10 is controlled by the electric signal input 24 that can be a manual or electronic device so that it transmits a control signal or signals via the leads 26 and 28 to the feedback and control electronics 20 that in turn transmits control signals via the leads 84 and 86 that connect the feedback and control electronics 20 with the Bimorph or flapper member 74 so that the position of the flapper member 74 is controlled by the signal from the electric signal input 24 via the feed back and control electronics 20.

As will be apparent from FIG. 2, the fluid that is present in output pressure aperture 184 is also present in the exhaust valve chamber 148. Consequently, the same fluid in the output pressure aperture 184 also enters the aperture 152. From there the fluid passes through the hole 144, the aperture 136, the hole 142, the aperture 125 to the conduit 48. From there, the fluid passes through the conduits 62 and 70 to the electronic feedback sensor 22 that is in turn connected to the feedback and control electronics 20 and also to the nozzle member 58 that works in conjunction with the flapper member 74.

In operation, if the fluid pressure in the output pressure aperture 184 is sufficient it will force the lower control diaphragm 116 upward along with the associated exhaust valve member 106 with its conduit 118 and the connected upper control diaphragm 96. As a consequence, the lower entrance or valve seat 182 of the aperture 118 is forced away from the spherical shaped portion 170 and hence fluid passes from the exhaust valve chamber 148 through the valve seat 182, the conduits 118 and 128 where it is exhausted to the atmosphere. At a certain point due to the decrease in pressure in the exhaust valve chamber 148, this will cause the spring 98 to force the control diaphragm 96, the exhaust valve member 106, and the diaphragm 116 downward so that the valve seat 120 is forced into contact with the spherical shaped portion 170 hence closing off the conduit 118 to any further fluid flow.

Conversely, if the fluid pressure in the output pressure outlet 184 drops below a certain value, the pressure of the spring 98 will force the diaphragm 96, associated exhaust valve member 106, and the connected lower diaphragm 116 downward. As a consequence the supply valve member 168 is forced downward and this results in the spherical shaped portion 174 of the valve member 168 being pushed downward away from the aperture 164. This causes fluid to flow from the supply pressure conduit 154, through the aperture 164 and into the exhaust valve chamber 148. At a certain point, due to increased pressure in the exhaust valve chamber 148, the spring 178 that exerts an upward force on the spherical shaped portion 174 of the exhaust valve and supply member 168 pushes the spherical shaped portion 174 into contact with the aperture 164 and this causes any further fluid to be prevented from passing into the exhaust valve chamber 148 as well as the associated output pressure outlet aperture 184.

As illustrated in FIG. 2, the Bimorph or flapper member 74 and its associated valve member 58 as well as the connected feedback and control electronics 20 and the electronic feedback sensor 22 permit precise control of the fluid pressure in the output pressure outlet aperture 184. In this connection, through electronic signals fed along the leads 84 and 86 to the flapper member 74, based upon information from the electronic feedback sensor 22 and the control electronics 20, the flapper member 74 can be caused to move away from or toward the valve member 58 and hence control the amount of fluid passing through the aperture 56 in the valve member 58.

As fluid pressure in the control chamber 92 increases, flow of fluid through the orifice 46 increases also. To maintain the pressure in the control chamber 92, the flow of fluid through the flapper nozzle 58 must match that of the fluid flowing out of the orifice 46. Because of the limited movement available from the piezoceramic actuator 74, alternate methods of enhancing the flow capacity of the flapper nozzle 58 over the operating range of the transducer are required.

The flow of fluid through the flapper nozzle 58 is a function of the flapper nozzle clearance and the differential pressure between the fluid inside the nozzle 56 and the fluid outside of the nozzle 40. For a ratio of areas of diaphragms 96 and 116 equal to 1:1, the differential pressure across the nozzle 58 remains constant regardless of the pressure in control chamber 92 and is a function of only the positive bias spring 98 working against the area of diaphragm 116. For area ratios of diaphragms 96 and 116 other than 1:1, the differential pressure across the nozzle 58 is a function of the positive bias spring, 98 as well as the ratio of the areas of diaphragms 96 and 116, and the output pressure 152. The following expression relates the ratio of areas of diaphragm 96 and 116 (A1/A2), the pressure in control chamber 92 (Ps), the positive bias pressure (Pb), and the output pressure (Po).

$$\frac{A1}{A2} = \frac{(Po - Pb)}{Ps}$$

To express the differential pressure across the flapper nozzle (Po–Ps) as a function of the output pressure (Po), the expression can be reworked to provide the expression.

$$Po - Ps = Po - \frac{A2}{A1(Po - Pb)}$$

When the ratio of areas of diaphragms 96 and 116 (A1/A2) is greater than 1:1, this arrangement of diaphragm ratios and output pressure porting creates a positive feedback system for the flapper nozzle 58 that enhances its mechanical gain. With a ratio of A1/A2 greater than 1:1, the preceding expression reveals that as the output pressure increases, the differential pressure across the flapper nozzle 58 increases also. Since the fluid flow through the bleed orifice 46 increases as the pressure in the control chamber 92 increases, the fluid flow through the flapper nozzle 58 must match this flow to maintain a constant pressure in control chamber 92. With a particular ratio of A1/A2 that is slightly greater than 1:1, the higher differential pressure that occurs across the flapper nozzle 58 as the pressure in control chamber 92 increases compensates for the flow out of flapper nozzle 58 such that the flapper nozzle clearance remains relatively constant for any particular pressure in control chamber 92 within the design pressure limits of the transducer 10. With this approach, the limited movement of the peizoceramic actuator 74 can effectively be used to control the pressure in control chamber 92 and the resulting output pressure.

In view of this arrangement, when the signals on the leads 84 and 86 cause the flapper member 74 to move away from the associated valve member 58 this causes a fluid, such as air, to pass through the valve member 58 and into the conduit 104 and from there into the chamber or cavity 92 where it exerts increased pressure on the upper surface 102 of the upper control diaphragm 96 which at a certain point will overcome the spring force from the spring 178 and the pressure in the exhaust valve chamber 148 and cause the diaphragm 96 and associated exhaust valve member 106 to push the supply valve member 168 downward to cause the spherical shaped portion 174 to be pushed away from the lower end portion 176 of the aperture 164 which causes additional air or other fluid in the supply pressure aperture 154 to pass into the exhaust valve chamber 148 and also into the associated output pressure conduit 184 in view of the aperture 192 so that the output pressure in the outer portion 186 of the output pressure conduit 184 increases.

Conversely, if the flapper member 74 is caused to move toward the valve member 58 when the flapper member 74 is away from the valve member 58 due to electronic signals on the leads 84 and 86, this shuts off flow of air or other fluid through the valve member 58. As a consequence, in view of the bleed orifice 46, pressure in the chamber 92 drops and this causes the air pressure present in chamber 148 to push up on the lower control diaphragm 116 causing the diaphragm 96 and associated exhaust valve member 106 to move upward which results in the spherical shaped portion 170 being separated from the valve seat 120 and as a consequence air or other fluid pressure in the exhaust valve chamber 148 and the output conduit 184 drops as the air passes to the atmosphere through the conduit 118, chamber 134 and the conduit 128.

In view of this arrangement, the electric signal input 24 that is fed on the leads 26 and 28 to the feedback and control electronics 20 that in turn results in signals to the Bimorph or flapper member 74 via the leads 84 and 86 effectively controls the fluid pressure in the output pressure outlet aperture 184 of the electric to pneumatic transducer 10.

Although the invention has been described in considerable detail with reference to a certain preferred embodiment, it will be understood that variations and modifications can be made to the invention without departing from the spirit and scope of the invention as set forth in the appended claims.

What is claimed is:

1. An electric to pneumatic transducer comprising a transducer housing with a supply pressure aperture, an output pressure aperture, an exhaust valve aperture and an associated exhaust valve member, a pair of diaphragms associated with said exhaust valve member, said diaphragms having different effective operational areas with one having a larger effective operational area than the other with the ratio of the effective operational areas of said diaphragms being between the limits set forth below:

$$1.5 > R > 1.0$$

where:

R=Area ratio of the effective areas of diaphragms A1 and A2=$A_1/A_2$

A1=Effective area of the larger diaphragm

A2=Effective area of the smaller diaphragm, and electronic feedback and control means located within said transducer housing for controlling the pressure in said output pressure aperture comprising a fluid valve nozzle for passing fluid and electronic valve means for controlling the passing of fluid from said fluid valve nozzle comprising an electrically deformable valve member, said electrically deformable valve member and said fluid valve nozzle being located to permit fluid to pass through said fluid valve nozzle and exert fluid pressure on the diaphragm having a larger effective operational area when said electrically deformable valve member is electrically deformed away from said fluid valve nozzle.

2. The electric to pneumatic transducer of claim 1 wherein the value of R is substantially 1.22.

3. The electric to pneumatic transducer of claim 1 wherein said output pressure aperture is in fluid communication with said fluid valve nozzle.

4. The electric to pneumatic transducer of claim 3 further comprising a spring member positioned to exert pressure on said diaphragm having the larger effective operational area.

5. The electric to pneumatic transducer of claim 4 further comprising a feedback sensor in electrical communication with said electronic feedback and control means and wherein fluid from said output pressure aperture is also in fluid communication with said feedback sensor.

6. The electric to pneumatic transducer of claim 5 wherein said exhaust valve aperture is located between the diaphragms forming said pair of diaphragms associated with said exhaust valve member.

* * * * *